US012597829B2

(12) United States Patent (10) Patent No.: US 12,597,829 B2
Yao et al. (45) Date of Patent: Apr. 7, 2026

(54) WEARABLE HUMAN BODY UPPER LIMB MOTION ENERGY HARVESTER

(71) Applicant: TIANGONG UNIVERSITY, Tianjin (CN)

(72) Inventors: Minghui Yao, Tianjin (CN); Zhaoqi Wang, Tianjin (CN); Yan Niu, Tianjin (CN); Qiliang Wu, Tianjin (CN); Jianen Chen, Tianjin (CN); Mingjun Tang, Tianjin (CN)

(73) Assignee: TIANGONG UNIVERSITY, Tianjin (CN)

( * ) Notice: Subject to any disclaimer, the term of this patent is extended or adjusted under 35 U.S.C. 154(b) by 0 days.

(21) Appl. No.: 18/852,040

(22) PCT Filed: Feb. 28, 2024

(86) PCT No.: PCT/CN2024/078968
§ 371 (c)(1),
(2) Date: Sep. 27, 2024

(87) PCT Pub. No.: WO2024/183574
PCT Pub. Date: Sep. 12, 2024

(65) Prior Publication Data
US 2026/0005580 A1 Jan. 1, 2026

(30) Foreign Application Priority Data

Mar. 3, 2023 (CN) .......................... 202310195943.3

(51) Int. Cl.
*H02K 7/18* (2006.01)
(52) U.S. Cl.
CPC .................................. *H02K 7/1861* (2013.01)

(58) Field of Classification Search
CPC ..................................................... H02K 7/1861
See application file for complete search history.

(56) References Cited

U.S. PATENT DOCUMENTS 1,506,282 A * 8/1924 Barbieri ................... A43B 3/35
74/130
2,029,148 A * 1/1936 Archer ................. H02K 7/1853
310/75 B
(Continued)

FOREIGN PATENT DOCUMENTS

AU 2006279208 A1 * 2/2007 ........... H02K 7/1853
CA 2294414 A1 * 11/1998 ............. A61B 34/76
(Continued)

OTHER PUBLICATIONS

International Search Report of PCT/CN2024/078968.
(Continued)

*Primary Examiner* — Pedro J Cuevas

(57) ABSTRACT
Disclosed is a wearable human body upper limb kinetic energy harvester, including a base, a cover plate, a belt drive mechanism, a gear drive mechanism, a helically arranged unidirectional excitation mechanism, a fixed beam, and a rotor power generation module, wherein the cover plate is fixed to a top wall of the base, a high-speed shaft, a low-speed shaft, and a gear shaft of a fixed gear are sequentially spaced from left to right in a cavity between the base and the cover plate along a vertical direction, the helically arranged unidirectional excitation mechanism, and the rotor power generation module which are coaxially and vertically spaced are connected to the high-speed shaft, and upper and lower ends of a gear shaft of the low-speed shaft are respectively and fixedly connected with an inner ring of a bearing installed in the cover plate and the base.

4 Claims, 5 Drawing Sheets

(56) References Cited

U.S. PATENT DOCUMENTS

| | | | | |
|---|---|---|---|---|
| 5,358,461 | A * | 10/1994 | Bailey, Jr. | A63B 21/153 |
| | | | | 290/1 R |
| 5,495,682 | A * | 3/1996 | Chen | A43B 3/35 |
| | | | | 36/137 |
| 6,059,506 | A * | 5/2000 | Kramer | B25J 13/025 |
| | | | | 700/264 |
| 6,201,314 | B1 * | 3/2001 | Landry | A43B 3/0042 |
| | | | | 310/75 B |
| 6,239,501 | B1 * | 5/2001 | Komarechka | H02P 9/04 |
| | | | | 36/2.6 |
| 6,255,799 | B1 * | 7/2001 | Le | H02J 7/1415 |
| | | | | 320/DIG. 34 |
| 6,281,594 | B1 * | 8/2001 | Sarich | A43B 3/35 |
| | | | | 290/1 R |
| 6,744,145 | B2 * | 6/2004 | Chang | A43B 3/36 |
| | | | | 322/3 |
| 6,822,343 | B2 * | 11/2004 | Estevez | H02K 7/1853 |
| | | | | 322/3 |
| 6,982,497 | B2 * | 1/2006 | Rome | A45F 3/08 |
| | | | | 310/329 |
| 7,361,999 | B2 * | 4/2008 | Yeh | H02K 7/1853 |
| | | | | 290/1 R |
| 7,391,123 | B2 * | 6/2008 | Rome | F03G 5/06 |
| | | | | 224/604 |
| 7,977,807 | B1 * | 7/2011 | Connor | F03G 5/062 |
| | | | | 290/1 R |
| 8,299,634 | B2 * | 10/2012 | Donelan | F03G 5/063 |
| | | | | 290/1 R |
| 8,487,456 | B2 * | 7/2013 | Donelan | F03G 5/086 |
| | | | | 290/1 R |
| 9,190,886 | B2 * | 11/2015 | Stanton | H02K 7/1861 |
| 9,362,803 | B2 * | 6/2016 | Panousis | F03G 5/063 |
| 9,407,125 | B2 * | 8/2016 | Shepertycky | A45F 3/04 |
| 9,525,323 | B1 * | 12/2016 | Lee | F03G 7/08 |
| 10,345,758 | B2 * | 7/2019 | Zhang | G04C 10/02 |
| 10,355,558 | B2 * | 7/2019 | Bao | H02S 40/22 |
| 10,579,017 | B2 * | 3/2020 | Zhou | G04B 5/08 |
| 10,830,562 | B2 * | 11/2020 | Himmelmann | F02C 6/04 |
| 10,864,100 | B2 * | 12/2020 | Walsh | A61F 5/0102 |
| 10,982,661 | B2 * | 4/2021 | Mullins | H02K 7/06 |
| 11,135,120 | B2 * | 10/2021 | Arzanpour | A61H 1/0262 |
| 11,171,544 | B2 * | 11/2021 | Chen | H02K 7/1125 |
| 11,254,016 | B2 * | 2/2022 | Lee | B25J 9/14 |
| 11,508,900 | B2 * | 11/2022 | Liao | H02N 2/18 |
| 11,779,796 | B2 * | 10/2023 | Larson | A63B 21/4043 |
| | | | | 482/139 |
| 12,057,761 | B1 * | 8/2024 | Sumpter | H02K 35/02 |
| 12,152,568 | B2 * | 11/2024 | Talarico | F03G 5/095 |
| 12,234,900 | B2 * | 2/2025 | Plante | B25J 9/102 |
| 2003/0168861 | A1 * | 9/2003 | Estevez | H02K 7/1853 |
| | | | | 290/1 R |
| 2004/0043873 | A1 * | 3/2004 | Wilkinson | A63B 21/00065 |
| | | | | 482/52 |
| 2004/0183306 | A1 * | 9/2004 | Rome | A45F 3/08 |
| | | | | 290/1 R |
| 2006/0192386 | A1 * | 8/2006 | Rome | A45F 3/08 |
| | | | | 290/1 R |
| 2007/0233279 | A1 * | 10/2007 | Kazerooni | A61H 1/024 |
| | | | | 623/24 |
| 2008/0277943 | A1 * | 11/2008 | Donelan | F03G 5/061 |
| | | | | 290/1 R |
| 2010/0276944 | A1 * | 11/2010 | Donelan | F03G 5/086 |
| | | | | 290/1 R |
| 2013/0038056 | A1 * | 2/2013 | Donelan | F03G 5/063 |
| | | | | 290/7 |
| 2015/0001853 | A1 * | 1/2015 | Shepertycky | F03G 5/08 |
| | | | | 290/1 E |
| 2015/0207384 | A1 * | 7/2015 | Panousis | H02K 7/1853 |
| | | | | 185/15 |
| 2019/0041798 | A1 * | 2/2019 | Zhang | G04B 5/08 |
| 2019/0140517 | A1 * | 5/2019 | Bao | H10N 10/13 |
| 2019/0339649 | A1 * | 11/2019 | Zhou | F03G 5/062 |
| 2020/0021216 | A1 * | 1/2020 | Talarico | F03G 5/095 |
| 2021/0048007 | A1 * | 2/2021 | Mullins | F03G 5/063 |
| 2023/0098877 | A1 * | 3/2023 | Plante | F16H 37/065 |
| | | | | 74/89.13 |
| 2025/0154937 | A1 * | 5/2025 | Talarico | F03G 5/086 |

FOREIGN PATENT DOCUMENTS

| | | | | | | |
|---|---|---|---|---|---|---|
| CA | 2630198 | A1 | * | 2/2007 | | H02K 7/1853 |
| CA | 2630198 | C | * | 5/2015 | | H02K 7/1853 |
| CN | 101263641 | B | * | 1/2012 | | H02K 7/1853 |
| CN | 204126824 | U | | 1/2015 | | |
| CN | 110080962 | A | * | 8/2019 | | F03G 7/10 |
| CN | 209875398 | U | * | 12/2019 | | F03G 7/08 |
| CN | 113294305 | A | * | 8/2021 | | F03G 7/08 |
| CN | 114932539 | A | | 8/2022 | | |
| CN | 218151274 | U | | 12/2022 | | |
| CN | 116317345 | A | | 6/2023 | | |
| EP | 0981423 | B1 | * | 11/2008 | | A61B 34/74 |
| EP | 2080595 | A2 | * | 7/2009 | | G06F 3/014 |
| EP | 2345951 | A2 | * | 7/2011 | | B25J 13/025 |
| EP | 1946429 | B1 | * | 6/2017 | | H02K 7/1853 |
| GB | 2088651 | A | * | 6/1982 | | F23Q 7/18 |
| JP | 2021080962 | A | * | 5/2021 | | F16H 35/00 |
| KR | 20220028317 | A | * | 3/2022 | | H02N 1/04 |
| KR | 20230007687 | A | | 1/2023 | | |
| WO | WO-2007016781 | A1 | * | 2/2007 | | H02K 7/1853 |

OTHER PUBLICATIONS

Written Opinion of PCT/CN2024/078968.
Fei Fei et al., "Human Kinetic Energy Harvesting Technology Based on Magnetic Levitation Structure", Journal of Zhejiang University(Engineering Science), Nov. 30, 2019.
Qingguo Li et al., "Biomechanical Energy Harvesting: Apparatus and Method", 2008 IEEE International Conference on Robotics and Automation, Jun. 13, 2008.

* cited by examiner

WEARABLE HUMAN BODY UPPER LIMB MOTION ENERGY HARVESTER

CROSS-REFERENCE TO RELATED APPLICATIONS

This application is a national stage application of PCT/CN2024/078968. This application claims priorities from PCT Application No. PCT/CN2024/078968, filed Feb. 28, 2024, and from the Chinese patent application 2023101959433 filed Mar. 3, 2023, the content of which are incorporated herein in the entirety by reference.

TECHNICAL FIELD

The present disclosure relates to a mechanical structure of a human body energy harvester, in particular to a wearable human body upper limb kinetic energy harvester.

BACKGROUND ART

Various wearable electronic devices have broad application prospects in the fields of environmental monitoring, human-computer interaction interfaces, and human health monitoring, etc. However, conventional battery-powered method for the wearable electronic devices faces practical problems such as the need for regular replacement, large battery size, and environmental pollution, and the power supply problem restricts the development of the wearable electronic devices. There is therefore an urgent need to conduct a study on a self-powered technology, in which the essence is human energy harvesting. Human kinetic energy is characterized by low frequency, periodic non-harmonic waves, and the like, whereas vibration sources of a conventional energy harvester are characterized by high frequency, resonance and the like. This results in the conventional energy harvester finding it difficult to achieve the ideal effect in kinetic energy harvesting of human bodies. In summary, the existing energy harvester has problems of incapability of effectively capturing low-frequency kinetic energy of human bodies and low energy harvesting efficiency in the field of kinetic energy harvesting of human bodies.

SUMMARY

The objective of the present disclosure is to provide a wearable human body upper limb kinetic energy harvester that is configured to improve energy harvesting efficiency in order to overcome defects in the prior art.

The present disclosure provides the following technical solutions for solving the above technical problems:

A wearable human body upper limb kinetic energy harvester of the present disclosure includes a base, wherein a cover plate is fixed to a top wall of the base, a high-speed shaft, a low-speed shaft, and a gear shaft of a fixed gear are sequentially spaced from left to right in a cavity between the base and the cover plate along a vertical direction, a spiral-based unidirectional excitation mechanism, a rotor mechanism of a rotor power generation module, and a limiting block which are coaxially and vertically spaced are connected to the high-speed shaft, and upper and lower ends of a gear shaft of the low-speed shaft are respectively and fixedly connected with an inner ring of a bearing installed in the cover plate and the base; the low-speed shaft is fixedly sleeved with a driving gear and a driven gear, the driving gear is fixedly connected with the driven gear along the vertical direction, a bottom of the high-speed shaft and a bottom of the gear shaft of the fixed gear are fixed to the base, and a lower end of the gear shaft is fixedly connected with the base;

One end of a fixed beam is tightly pressed against the fixed gear, and the other end of the fixed beam is fixedly connected to the base; the fixed gear engages with the driven gear, a ratio of the number of teeth of the fixed gear to the number of teeth of the driven gear is larger than 1, and the fixed beam is provided with a fixed end that may be fixed to the human body; the helically arranged unidirectional excitation mechanism includes an outer layer with an internal threaded hole in a middle, the outer layer is positioned above the rotor mechanism, external threads are arranged on an outer wall of a lower portion of an inner layer, and the external threads on the lower portion of the inner layer are in threaded connection with the internal threaded hole of the outer layer; the driven gear is arranged on an upper portion of the outer layer and connected with the driving gear through a belt, and a diameter of the driving gear is larger than that of the driven gear; and the inner layer and the limiting block are fixedly connected with the base, the rotor mechanism is rotationally connected with the high-speed shaft, a spring sleeves the high-speed shaft between the rotor mechanism and the limiting block, upper and lower ends of the spring are respectively and fixedly connected with the rotor mechanism and the limiting block, the outer layer may move up and down away from the rotor mechanism or make contact with the rotor mechanism, and drive the rotor mechanism to rotate under the action of force of friction, and a stator of the rotor power generation module is installed inside the base.

The present disclosure has the following beneficial effects:

The structure of the present disclosure introduces a gear drive mechanism, a belt drive mechanism, and the helically arranged unidirectional excitation mechanism, such that lower-frequency kinetic signals of the human body can be transformed into high-frequency signals by means of a drive ratio of the gear drive mechanism to the belt drive mechanism. The signals are further transmitted to the rotor power generation module through the helically arranged unidirectional excitation component to transform mechanical energy into electric energy, such that the objective of improving the harvesting efficiency of kinetic energy of the human body is achieved, the problems that the existing energy harvester cannot effectively harvest the low-frequency kinetic energy of the human body, and that the energy harvesting efficiency is low in the field of energy harvesting are solved, and the energy harvesting efficiency is improved.

BRIEF DESCRIPTION OF THE DRAWINGS

To describe the specific implementations of the present disclosure or the technical solutions in the prior art more clearly, the drawings required to be used in the specific implementations or the prior art will be simply introduced below. Apparently, the drawings in the following description merely show some implementations of the present disclosure, and a person of ordinary skill in the art can still obtain other drawings from these drawings, without creative labor.

FIG. 8-1 is a waveform diagram illustrating test voltage for a walking experiment of a structure as shown in FIG. 7; and FIG. 8-2 is a waveform diagram illustrating test voltage for a running experiment of a structure as shown in FIG. 7.

DETAILED DESCRIPTION OF THE EMBODIMENTS

Figure 1:
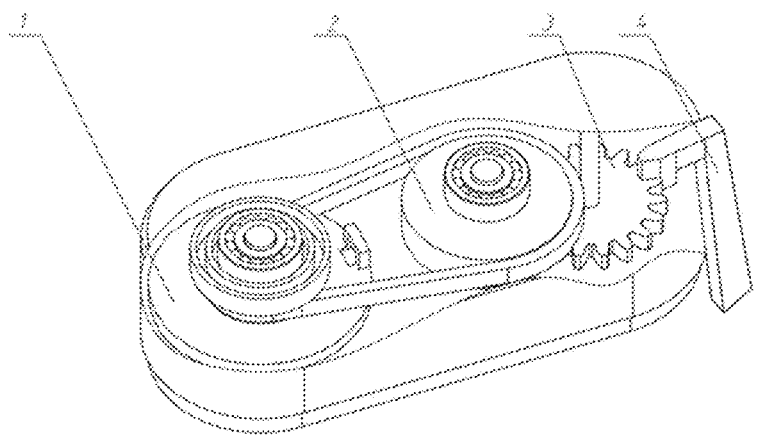
FIG. 1 is a perspective view of a wearable upper limb kinetic energy harvester for a human body according to an embodiment of the present disclosure.

In order to make the objectives, technical solutions, and advantages of the embodiments of the present disclosure clearer, the technical solutions of the present disclosure will be described clearly and completely with reference to the drawings, and it should be apparent that the described embodiments are a part of the embodiments, and not all of the embodiments. All other embodiments obtained by a person of ordinary skill in the art without involving inventive effort based on the embodiments in the present disclosure fall within the scope of protection of the present disclosure.

As shown in the drawings, a mechanical structure of a wearable human body upper limb kinetic energy harvester includes a base 8, wherein a cover plate 7 is fixed to a top wall of the base 8, a high-speed shaft, a low-speed shaft 9, and a gear shaft of a fixed gear 3 are sequentially spaced from left to right in a cavity between the base 8 and the cover plate along a vertical direction, a helically arranged unidirectional excitation mechanism, a rotor mechanism 5 of a rotor power generation module, and a limiting block which are coaxially and vertically spaced are connected to the high-speed shaft, and upper and lower ends of a gear shaft of the low-speed shaft 9 are respectively and fixedly connected with an inner ring of a bearing installed in the cover plate 7 and the base 8. The low-speed shaft 9 is fixedly sleeved with a driving gear 2 and a driven gear 6, and the driving gear 2 is fixedly connected with the driven gear 6 along the vertical direction. Upper and lower ends of the high-speed shaft are respectively and fixedly connected with the cover plate 7 and the base 8, and a lower end of the gear shaft is fixedly connected with the base 8.

One end of a fixed beam 4 is tightly pressed against the fixed gear 3, the fixed gear 3 is fixed by the fixed beam 4, and the other end of the fixed beam 4 is fixedly connected to the base 8; and the fixed gear 3 engages with the driven gear 6, a ratio of the number of teeth of the fixed gear to the number of teeth of the driven gear is larger than 1, and the fixed beam is provided with a fixed end that may be fixed to the human body. The effect of a gear drive mechanism lies in an arrangement where a small gear may rotate circumferentially around a large fixed gear. The fixed beam achieves the following two effects: on one hand, it may fully lock the fixed gear, allowing it to be thoroughly "fixed"; and on the other hand, it facilitates connection with the human body, and an extending portion of the fixed beam may be fixed to the body for better kinetic energy harvesting of human bodies. The design for rotational movement around a circular path is intended to allow the whole gear drive mechanism to swing around a center of circle of the fixed gear as an upper limb swings after the harvester is worn on the human body. At this moment, the driven gear will swing in a small half-circle around the fixed gear in the gear drive mechanism.

The helically arranged unidirectional excitation mechanism includes an outer layer 10 with an internal threaded hole in a middle, the outer layer is positioned above the rotor mechanism, external threads are arranged on an outer wall of a lower portion of an inner layer 11, and the external threads on the lower portion of the inner layer are in threaded connection with the internal threaded hole of the outer layer; and the driven gear is arranged on an upper portion of the outer layer and connected with the driving gear 2 through a belt, and a diameter of the driving gear 2 is larger than that of the driven gear. The inner layer and the limiting block are fixedly connected with the base, the rotor mechanism is rotationally connected with the high-speed shaft, a spring sleeves the high-speed shaft between the rotor mechanism and the limiting block, upper and lower ends of the spring are respectively and fixedly connected with the rotor mechanism and the limiting block, and the outer layer may move up and down away from the rotor mechanism or make contact with the rotor mechanism, and drive the rotor mechanism to rotate under the action of force of friction. A stator of the rotor power generation module is installed inside the base 8.

Since the kinetic rule of the upper limb of the human body is a reciprocating movement, and the inner layer of the helically arranged unidirectional excitation mechanism is fixedly connected with the base, the outer layer may move up and down along an axial direction of the high-speed shaft, thus achieving a movement process of repeatedly contacting with and disengaging from the rotor mechanism 5. During the process of pressing the outer layer of the helically arranged unidirectional excitation mechanism against the rotor mechanism 5, the force of friction is generated due to contact, which drives the rotor mechanism 5 to rotate. The helically arranged unidirectional excitation mechanism may implement unidirectional rotational excitation on the rotor mechanism 5, since the outer layer of the helically arranged unidirectional excitation mechanism is fixed in the rotation direction as it moves away from the rotor mechanism 5.

Preferably, a power generation limiting plate 1 is of an annular structure. The power generation limiting plate 1 sleeves the outer layer at intervals and is positioned above the rotor mechanism 5, an edge of the power generation limiting plate is fixed to an annular table projecting from an inner wall of the base 8, and the power generation limiting plate functions to restrict the moving range of the outer layer of the helically arranged unidirectional excitation mechanism.

The wearable upper limb kinetic energy harvester transfers energy from the helically arranged unidirectional excitation mechanism to the rotor power generation module, and generates electricity with Faraday's law of electromagnetic induction. For details of the structure of the rotor power generation module, please refer to Guo S, Gao S, Jin L, et al. Mechanism, theory and application research of a rotating electromagnetic energy harvester suitable for multi-directional excitation [J]. Journal of Physics, D. Applied Physics: A Europhysics Journal, 2022(8):55.

Preferably, an edge of the cover plate 7 is detachably connected with the base 8.

Figure 7:
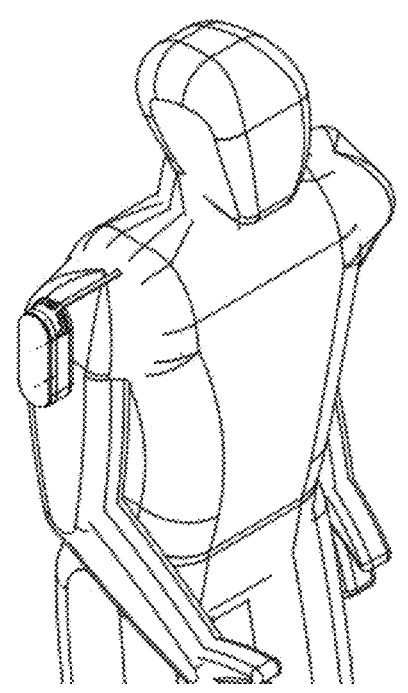
FIG. 7 is a schematic diagram illustrating human wearing of an energy harvester according to the present disclosure.

The working principle of the apparatus is as follows:

As shown in FIG. 7, an upper side of the wearable upper limb kinetic energy harvester is fixed to an upper surface of a shoulder through the fixed beam, and a main part of the wearable upper limb kinetic energy harvester is fixed to the upper limb through a strap. When a person walks and swings arms, the base swings to drive the driven gear to revolve around the center of circle of the fixed gear in the gear drive mechanism, the driven gear engages with the fixed gear, and the driven gear rotates on its own axis while revolving. In the belt drive mechanism, the driving gear and the driven gear are connected with the low-speed shaft for rotating along the same axis and at the same speed. In the belt drive mechanism, the driving gear is connected with the outer layer of the helically arranged unidirectional excitation mechanism through a belt, and the driving gear rotates to drive the outer layer of the helically arranged unidirectional excitation mechanism to rotate at an accelerated speed. When the human body swings the arms forward, the outer layer of the helically arranged unidirectional excitation mechanism makes a rotation opposite to the inner layer of the helically arranged unidirectional excitation mechanism. Due to a threaded connection between the outer layer and the inner layer, the outer layer of the helically arranged unidirectional excitation mechanism gradually moves closer to the rotor mechanism in the rotor power generation module until they contact with each other and press against each other. When the person swings the arms backward, the outer layer of the helically arranged unidirectional excitation mechanism makes a rapid rotation opposite to the rotor in the rotor power generation module; due to the threaded connection between the outer layer of the helically arranged unidirectional excitation mechanism and the inner layer of the helically arranged unidirectional excitation mechanism, the outer layer of the helically arranged unidirectional excitation mechanism gradually disengages from the rotor in the rotor power generation module during rotation, at which point the rotor mechanism in the rotor power generation module will continue rotating due to its own inertia. The above process is repeated back and forth with the alternating swinging of the arms of the human body, making the rotor in the rotor power generation module rotate at a sustained high speed within a periodic cycle. A permanent magnet at a periphery of the rotor in the rotor power generation module makes a rotation opposite to a coil of the stator in the base, causing the permanent magnet and the coil to cut through magnetic induction lines, thus achieving power generation.

The testing process of the apparatus is as follows:

The apparatus is worn on the right upper limb of an experimenter.

A lead wire of the rotor power generation module is connected to an RIGOL oscilloscope for detecting voltage waveform signals.

Under laboratory conditions, experiments were performed on the experimenter in walking and running modes, and detection results in the two kinetic modes were obtained.

Figure 2:
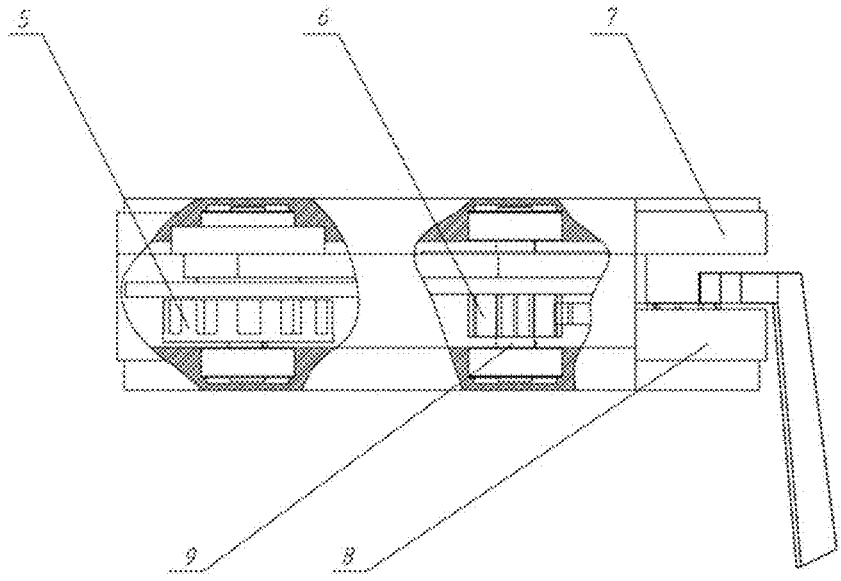
FIG. 2 is a front view of the wearable upper limb kinetic energy harvester for a human body according to an embodiment of the present disclosure.
Figure 3:
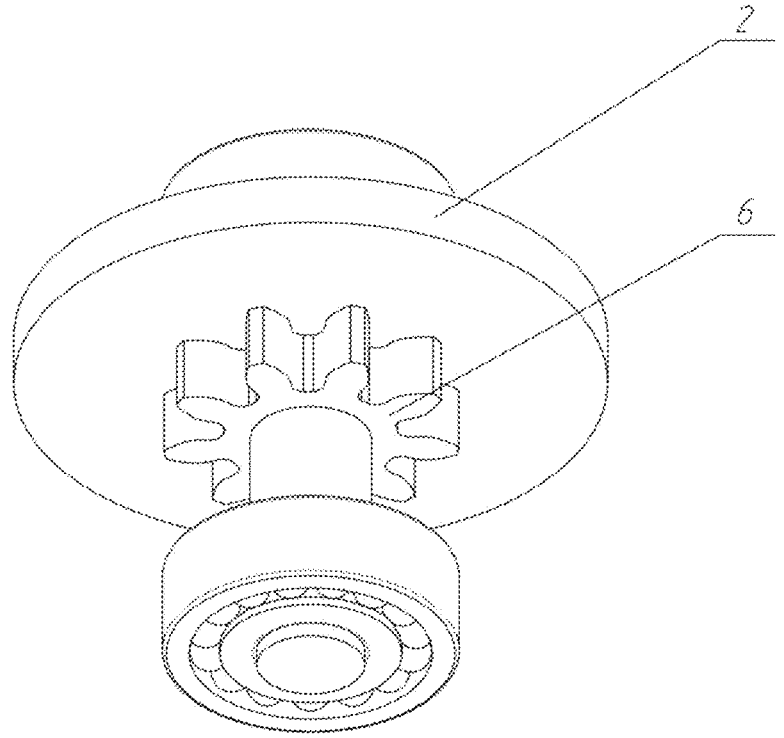
FIG. 3 is a perspective view illustrating a low-speed shaft in the energy harvester as shown in FIG. 1.
Figure 4:
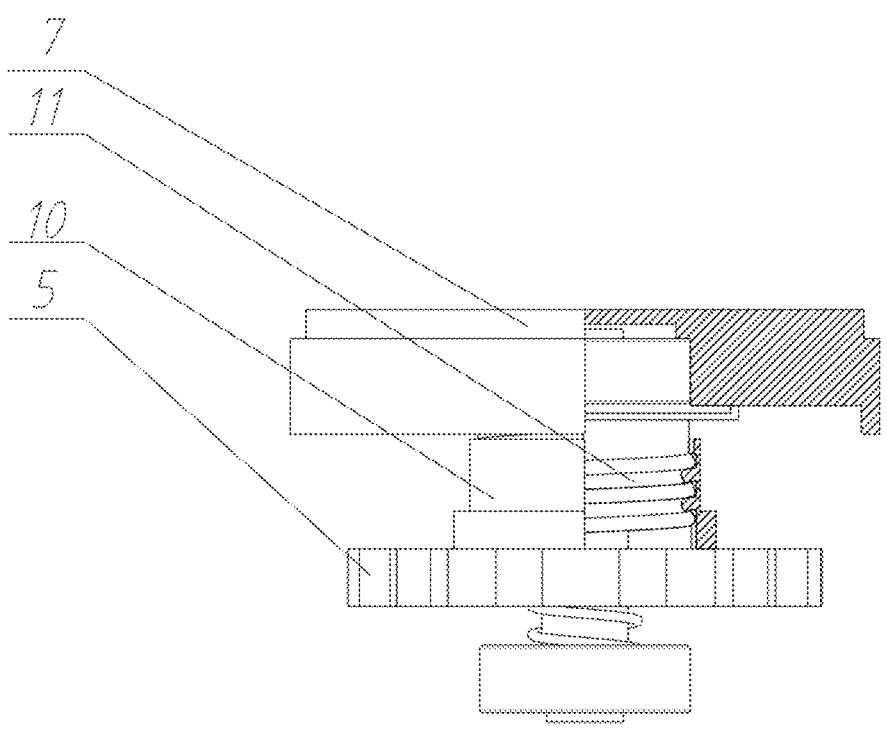
FIG. 4 is a front view illustrating the low-speed shaft as shown in FIG. 3.
Figure 5:
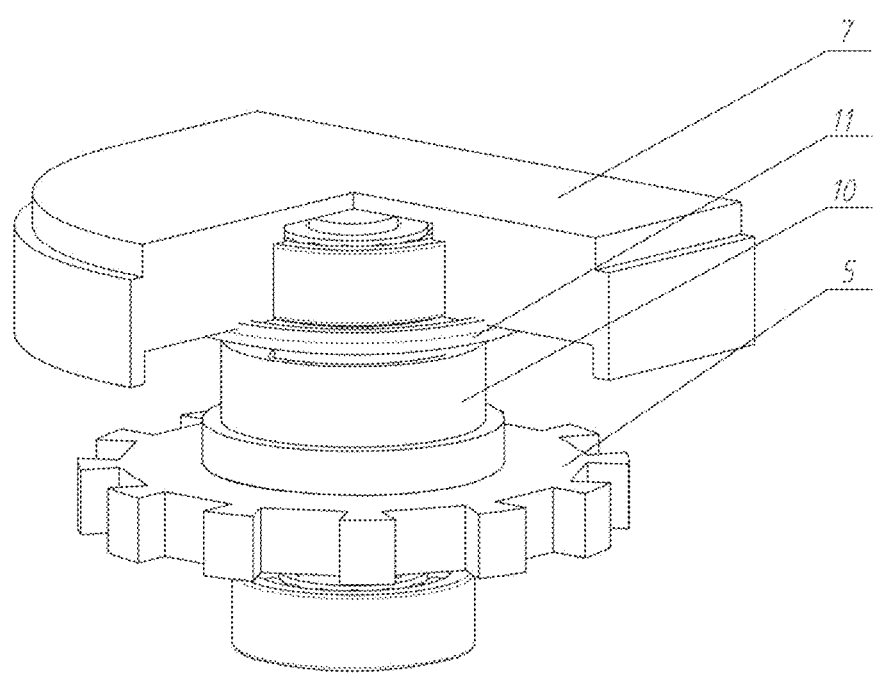
FIG. 5 is a perspective view illustrating a high-speed shaft in the energy harvester as shown in FIG. 1.
Figure 6:
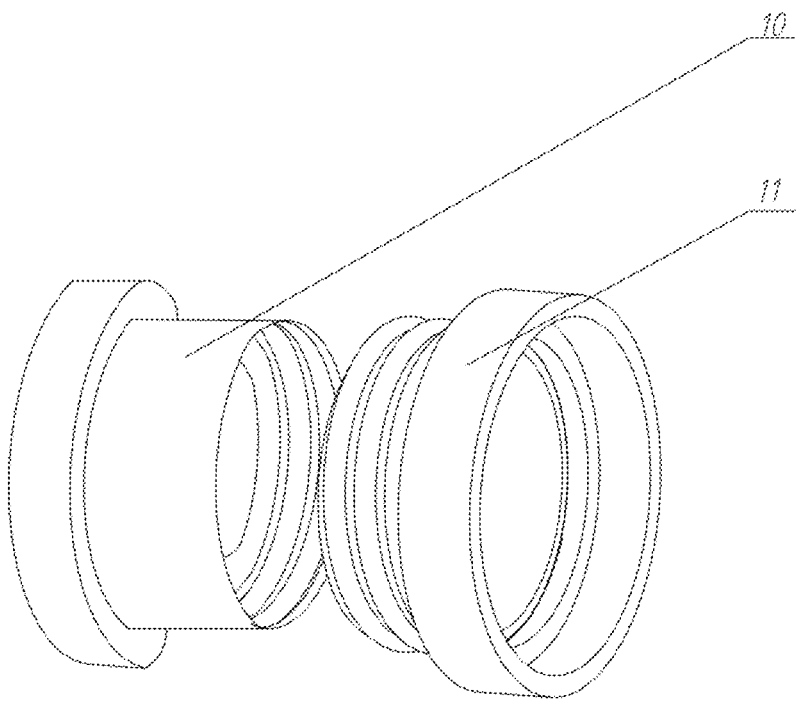
FIG. 6 is a perspective view illustrating a helically arranged unidirectional excitation mechanism according to an embodiment of the present disclosure.
Figures 1, 8:
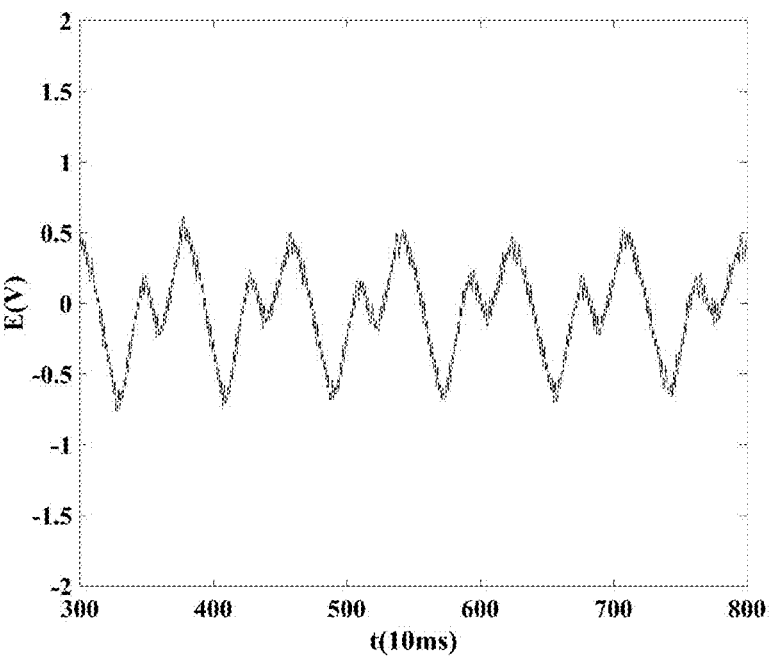
Figures 2, 8:
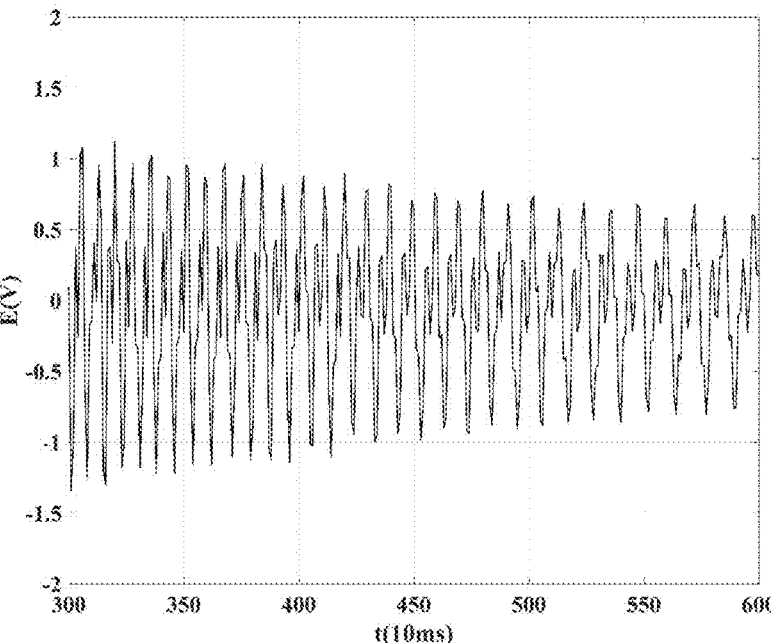

The test effect shows that current following an alternating-current rule was obtained in the walking and running states. As shown in FIG. 8-1, during the walking process, voltage frequency is lower, peak voltage drops, and an effective value is lower; and as shown in FIG. 8-2, during the running process, voltage frequency is higher, peak voltage is higher, and an effective value is higher.

It can be concluded that regardless of the kinetic state, such as running or walking, the apparatus is capable of meeting requirements of power supply for a wearable sensor for the human body, and the more intense the exercise, the higher the power generation efficiency. The generated power may be stored in an energy storage circuit and supplied to other devices. For details on the energy storage circuit, please refer to P. Mayer, M. Magno, L. Benini, Energy-positive activity recognition—from kinetic energy harvesting to smart self-sustainable wearable devices [J], IEEE Transactions On Biomedical Circuits And Systems, 2021, 15(5): 926-937. Since energy storage is not the inventive point of the present disclosure, it will not be described in detail.

A person skilled in the art may readily understand that, for the sake of brevity and convenience of description, the specific operational processes of the system and apparatus mentioned above may be referred to the corresponding processes in the above method embodiment, which will not be reiterated here.

Additionally, in the description of embodiments of the present disclosure, unless otherwise clearly specified and limited, terms "installed", "coupled", and "connected" should be broadly understood. For example, the terms may refer to fixed connection, detachable connection or integrated connection; the terms may refer to mechanical connection or electric connection; and the terms may refer to direct connection, indirect connection through an intermediate medium, or communication between interiors of two elements. For a person of ordinary skill in the art, the specific meaning of the above terms in the present disclosure can be understood according to specific circumstances.

In the description of the present disclosure, it is to be understood that orientation or position relationships indicated by terms "upper", "lower", "left", "right", "inner", "outer", "axial", "circumferential", and the like are orientation or position relationships as shown in the drawings, are adopted not to indicate or imply that indicated devices or components must be in specific orientations or structured and operated in specific orientations but only to conveniently and simply describe the present disclosure and thus should not be understood as a limitation to the disclosure.

Finally, it should be noted that the above embodiments are merely specific implementations of the present disclosure, and are used for illustrating the technical solutions of the present disclosure instead of limiting them, and the scope of protection of the present disclosure is not limited thereto. Although the present disclosure is illustrated in detail with reference to the above embodiments, it should be understood by a person of ordinary skill in the art that any person skilled in the art can still modify or easily conceive of variations within the technical solutions recorded in the above embodiments within the technical scope as disclosed in the present disclosure, or equivalently substitute part of technical features therein. These modifications or substitutions cannot make the essence of the corresponding technical solutions depart from the spirit and scope of the technical solutions of the embodiments of the present disclosure, and are intended to be included in the scope of protection of the present disclosure. Therefore, the scope of protection of the present disclosure should follow the scope of protection of the claims.

What is claimed is:

1. A wearable human body upper limb kinetic energy harvester, comprising a base (8), wherein a cover plate (7) is fixed to a top wall of the base, a high-speed shaft, a low-speed shaft (9), and a gear shaft of a fixed gear (3) are sequentially spaced from left to right in a cavity between the base and the cover plate along a vertical direction, a helically arranged unidirectional excitation mechanism, a rotor mechanism (5) of a rotor power generation module, and a limiting block are coaxially and vertically spaced and connected to the high-speed shaft, and upper and lower ends of a gear shaft of the low-speed shaft are respectively and fixedly connected with an inner ring of a bearing installed in the cover plate and the base; the low-speed shaft is fixedly sleeved with a driving gear (2) and a driven gear (6), the driving gear is fixedly connected with the driven gear along the vertical direction, a bottom of the high-speed shaft and a bottom of the gear shaft of the fixed gear are fixed to the base, and a lower end of the gear shaft is fixedly connected with the base;

one end of a fixed beam (4) is tightly pressed against the fixed gear, and the other end of the fixed beam is fixedly connected to the base; the fixed gear (3) engages with the driven gear (6), a ratio of the number of teeth of the fixed gear to the number of teeth of the driven gear is larger than 1, and the fixed beam is provided with a fixed end, wherein the fixed end is configured to be fixed to the human body; the helically arranged unidirectional excitation mechanism comprises an outer layer (10) with an internal threaded hole in a middle, the outer layer is positioned above the rotor mechanism, external threads are arranged on an outer wall of a lower portion of an inner layer (11), and the external threads on the lower portion of the inner layer are in threaded connection with the internal threaded hole of the outer layer; the driven gear is arranged on an upper portion of the outer layer and connected with the driving gear (2) through a belt, and a diameter of the driving gear is larger than that of the driven gear; and the inner layer and the limiting block are fixedly connected with the base, the rotor mechanism is rotationally connected with the high-speed shaft, a spring sleeves the high-speed shaft between the rotor mechanism and the limiting block, upper and lower ends of the spring are respectively and fixedly connected with the rotor mechanism and the limiting block, the outer layer is configured to move up and down away from the rotor mechanism or make contact with the rotor mechanism, and drive the rotor mechanism to rotate under the action of force of friction, and a stator of the rotor power generation module is installed inside the base.

2. The wearable human body upper limb kinetic energy harvester according to claim 1, wherein a power generation limiting plate with an annular structure sleeves the outer layer at intervals and is positioned above the rotor mechanism, and an edge of the power generation limiting plate is fixed to an annular table projecting from an inner wall of the base.

3. The wearable human body upper limb kinetic energy harvester according to claim 2, wherein an edge of the cover plate is detachably connected with the annular table of the base.

4. The wearable human body upper limb kinetic energy harvester according to claim 1, wherein an edge of the cover plate is detachably connected with the annular table of the base.

\* \* \* \* \*